United States Patent
Jang et al.

(10) Patent No.: US 7,811,641 B2
(45) Date of Patent: Oct. 12, 2010

(54) METHOD OF FORMING CARBON NANOTUBES, FIELD EMISSION DISPLAY DEVICE HAVING CARBON NANOTUBES FORMED THROUGH THE METHOD, AND METHOD OF MANUFACTURING FIELD EMISSION DISPLAY DEVICE

(75) Inventors: Jin Jang, Seoul (KR); Kyu-Chang Park, Seoul (KR); Sung-Hoon Lim, Seoul (KR)

(73) Assignee: Industry Academic Cooperation Foundation of Kyunghee University (KR)

( * ) Notice: Subject to any disclaimer, the term of this patent is extended or adjusted under 35 U.S.C. 154(b) by 231 days.

(21) Appl. No.: 12/139,154

(22) Filed: Jun. 13, 2008

(65) Prior Publication Data

US 2008/0248218 A1 Oct. 9, 2008

Related U.S. Application Data

(62) Division of application No. 11/285,552, filed on Nov. 21, 2005, now Pat. No. 7,492,088.

(30) Foreign Application Priority Data

Nov. 24, 2004 (KR) ............... 10-2004-0096820

(51) Int. Cl.
*H05H 1/24* (2006.01)
*B05D 5/12* (2006.01)

(52) U.S. Cl. ............ 427/570; 427/58; 427/77; 427/78; 427/249.1; 427/569

(58) Field of Classification Search ........... 427/58, 427/77, 249.1
See application file for complete search history.

(56) References Cited

U.S. PATENT DOCUMENTS 6,472,802 B1 10/2002 Choi et al.
2002/0080099 A1* 6/2002 Song et al. ............. 345/75.2

OTHER PUBLICATIONS

Notice of Allowance for U.S. Appl. No. 11/285,552, mailed Nov. 28, 2008, 6 pages.
Chen et al., "Field emission of carbon nanotubes on anodic aluminum oxide template with controlled tube density", Applied Physics Letters, Mar. 17, 2005, American Institute of Physics, 3 pages.
Office Action for U.S. Appl. No. 11/285,552, mailed Aug. 6, 2008, 25 pages.

* cited by examiner

*Primary Examiner*—Timothy H Meeks
*Assistant Examiner*—Collette Ripple
(74) *Attorney, Agent, or Firm*—Sheridan Ross P.C.

(57) ABSTRACT

There are provided a method of forming carbon nano tubes, a field emission display device having the carbon nanotubes formed using the method, and a method of manufacturing the field emission display device. The method of forming carbon nanotubes includes forming a catalytic metal layer on a substrate, forming an insulation layer on the catalytic metal layer, and forming carbon nanotubes on the insulation layer.

22 Claims, 12 Drawing Sheets

METHOD OF FORMING CARBON NANOTUBES, FIELD EMISSION DISPLAY DEVICE HAVING CARBON NANOTUBES FORMED THROUGH THE METHOD, AND METHOD OF MANUFACTURING FIELD EMISSION DISPLAY DEVICE

CROSS REFERENCE TO RELATED APPLICATIONS

This application is a divisional application of application Ser. No. 11/285,552 filed on Nov. 21, 2005, now U.S. Pat. No. 7,492,088 the entire disclosure of which is hereby incorporated by reference.

BACKGROUND OF THE INVENTION (a) Field of the Invention

The present invention relates to a method of forming carbon nanotubes, a field emission display device having the carbon nanotubes formed through the use of the method, and a method of manufacturing the field emission display device, and more particularly, to a method of forming carbon nanotubes of which a generation density can be controlled, a field emission display device having the carbon nanotubes formed through the use of the method, and a method of manufacturing the field emission display device.

(b) Description of the Related Art

Carbon nanotubes (CNT) are carbon allotropes and have a tube shape in which carbon atoms are coupled to each other in a hexagonal honeycomb shape. Since such carbon nanotubes have excellent mechanical characteristics, electrical selectivity, and field emission characteristics, the carbon nanotubes are widely used in various fields of electrics and electronics.

Particularly, studies for applying the carbon nanotubes to a field emission display device (FED) which is one of next-generation flat panel display devices have been vigorously carried out.

The field emission display device (FED) serves as a display device, wherein when a positive voltage of several hundreds volts is applied to a cone-shaped electron emission portion from an external gate electrode, electrons are emitted from the electron emission portion under a strong electric field and the emitted electrons collide with an anode electrode coated with fluorescent substances.

In such a field emission display device, a silicon tip or a metal tip made of molybdenum (Mo) or the like was mainly used as the electron emission portion. However, such a field emission display has problems in that an operation voltage is very high and leakage current is high due to deterioration of the tip resulting from emission of a high current, thereby deteriorating reliability and performance of the device.

A field emission display device using carbon nanotubes as the electron emission portions has been suggested for solving such problems.

However, since it is difficult to effectively control a generation density of the carbon nanotubes, the field emission display device has problems in that a production yield is low and a large size cannot be realized.

SUMMARY OF THE INVENTION

The present invention is contrived to solve the above-mentioned problems. It is an object of the present invention is to provide a method of forming carbon nanotubes of which a generation density can be controlled to enhance uniformity and production yield, a field emission display device having the carbon nanotubes formed through the method, and a method of manufacturing the field emission display device.

According to an aspect of the present invention, there is provided a method of forming carbon nanotubes, including forming a catalytic metal layer on a substrate, forming an insulation layer on the catalytic metal layer, and forming carbon nanotubes on the insulation layer.

In the method of forming carbon nanotubes, the insulation layer may be made of at least one of silicon nitride (SiNx), silicon oxi-nitride (SiON), and amorphous carbon, and it may have a thickness of 10 to 150 nm.

In the method, the forming of the carbon nanotubes may include annealing the substrate, and performing a plasma enhanced chemical vapor deposition process using at least one kind of hydrocarbon gas.

According to another aspect of the present invention, there is provided a field emission display device including: a first substrate, a cathode layer formed on the first substrate; a catalytic metal layer formed in a predetermined area on the cathode layer; an insulation layer formed on the cathode layer and the catalytic metal layer; an electron emission portion which is formed in a predetermined area on the insulation layer and is made of carbon nanotubes; a gate electrode formed on the insulation layer; and an anode electrode and a fluorescent layer on a second substrate opposed to the first substrate.

According to still another aspect of the present invention, there is provided a method of manufacturing a field emission display device, including forming a cathode layer on a first substrate, forming a catalytic metal layer in a predetermined area on the cathode layer; forming an insulation layer on the entire surface including the catalytic metal layer; forming a gate electrode on the insulation layer; forming carbon nanotubes on the insulation layer; and forming an anode electrode and a fluorescent layer on a second substrate opposed to the first substrate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, exemplary embodiments of the present invention will be described in detail with reference to the attached drawings such that the present invention can be easily put into practice by those skilled in the art. However, the present invention is not limited to the exemplary embodiments, but may be embodied in various forms.

In the drawings, thicknesses are enlarged for the purpose of clearly illustrating layers and areas. In addition, like elements are denoted by like reference numerals. If it is mentioned that a layer, an area, or a plate is placed on a different one, it includes a case that the layer, area, or plate is placed directly on the different one, as well as a case that another one is disposed therebetween. On the contrary, if it is mentioned that one element is placed directly on another element, it means that no element is disposed therebetween.

A method of forming carbon nanotubes according to an exemplary embodiment of the present invention will be first described in detail with reference to FIGS. 1 to 7.

Figure 1:
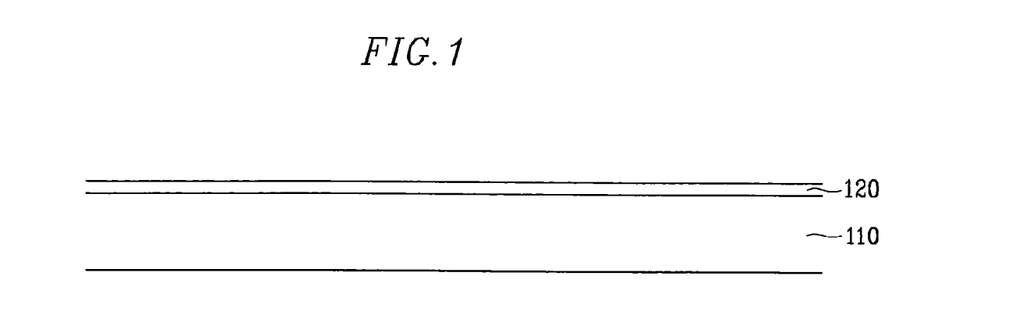
FIGS. 1 to 7 are cross-sectional views sequentially illustrating a method of forming carbon nanotubes according to an embodiment of the present invention.

First, as shown in FIG. 1, a diffusion-preventing layer 120 made of a titanium (Ti) layer or a titanium alloy (Ti-alloy) layer in which tungsten (W) or the like is mixed with titanium (Ti) is formed on a substrate 110 made of glass, quartz, silicon, or alumina ($Al_2O_3$). The diffusion-preventing layer 120 has a thickness of about 5 to 20 nm. The diffusion-preventing layer 120 serves to prevent catalytic metal of catalytic metal layers deposited thereon later from diffusing into the substrate 110, and may be omitted in some cases.

Next, catalytic metal layers 130 are formed on the diffusion-preventing layer 120 by the use of a lift-off process.

The lift-off process is performed as follows.

Figure 2:
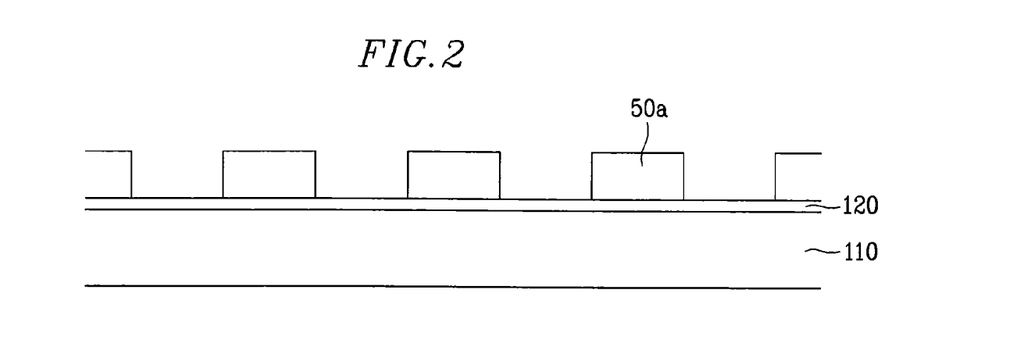

First, as shown in FIG. 2, a photo resist pattern 50a is formed by depositing and patterning photo resist on the diffusion-preventing layer 120.

Figure 3:
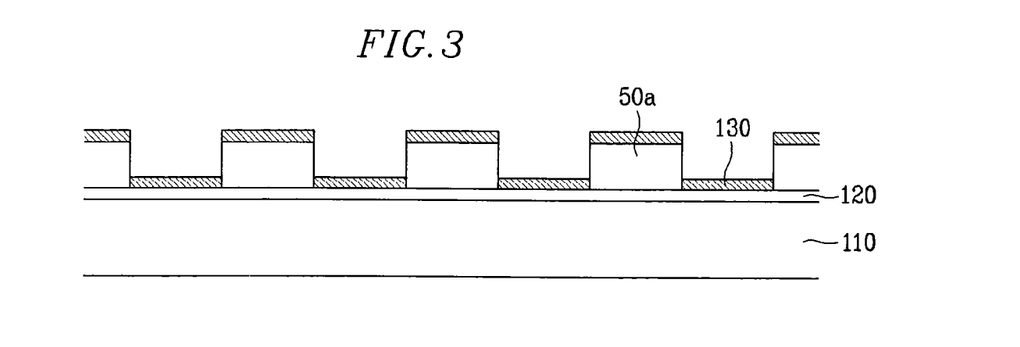

Next, as shown in FIG. 3, a catalytic metal layer 130 is formed on the entire surface of the substrate 110 including the photo resist pattern 50a. The catalytic metal layer 130 is made of a single metal such as nickel (Ni), iron (Fe), or cobalt (Co), or an alloy such as cobalt-nickel (Co—Ni), cobalt-iron (Co—Fe), nickel-iron (Ni—Fe), or cobalt-nickel-iron (Co—Ni—Fe). The catalytic metal layer 130 is formed on the substrate 110 with a thickness of several Å to several tens of Å, preferably 3 to 30 Å, through the use of a thermal evaporation method, a sputtering method, or an electron beam evaporation method.

Figure 4:
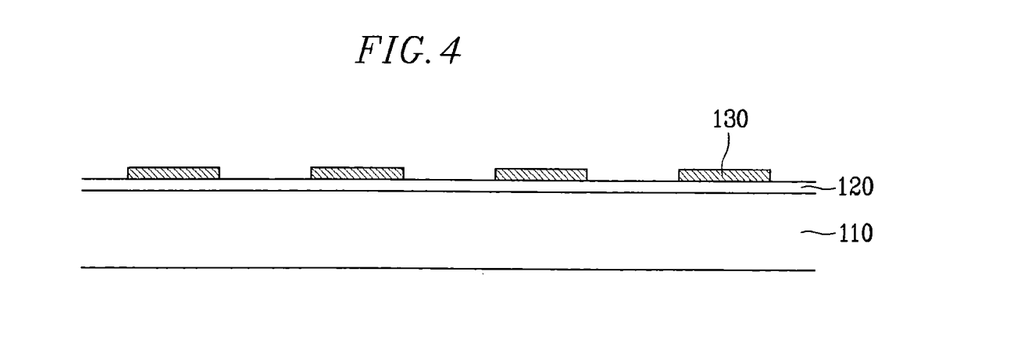

Next, by removing the photo resist pattern 50a, the catalytic metal layers 130 isolated with predetermined intervals are formed as shown in FIG. 4.

In the present embodiment, the lift-off process of first forming the photo resist and then forming the catalytic metal layer is used for forming the catalytic metal layers 130. However, a lithography process of first forming the catalytic metal layer 130 on the entire surface of the substrate 110 and then depositing and exposing the photo resist may be used instead of the lift-off process.

Figure 5:
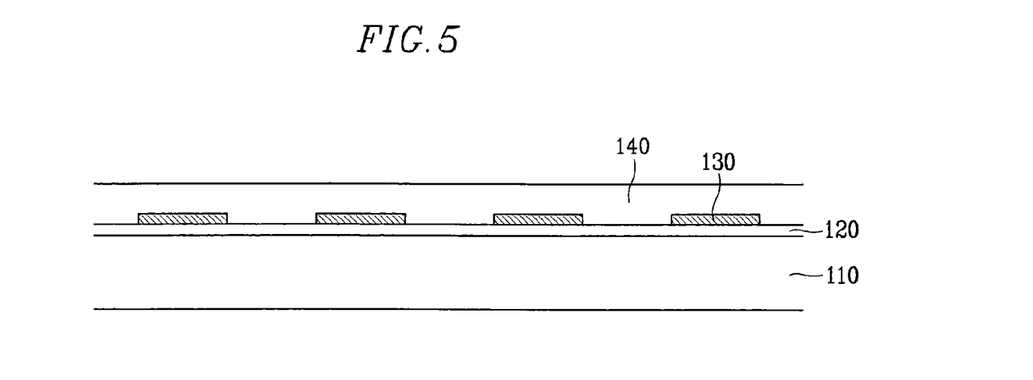

Subsequently, as shown in FIG. 5, a silicon nitride (SiNx) layer 140 is formed on the entire surface of the substrate 110 including the catalytic metal layers 130. Instead of the silicon nitride (SiNx) layer, an insulation layer made of silicon oxinitride (SiON) or amorphous carbon may be formed. The insulation layers made of silicon nitride (SiNx), silicon oxinitride (SiON), and amorphous carbon, respectively, have a common point in that micro defects are generated in the layers by heating the layers. The silicon nitride layer 140 has a thickness of about 10 to 150 nm.

Next, an annealing process is performed to the substrate 110 in a plasma furnace. The annealing process is performed at a temperature of about 300 to 800° C. for about 100 to 300 minutes.

Figure 6:
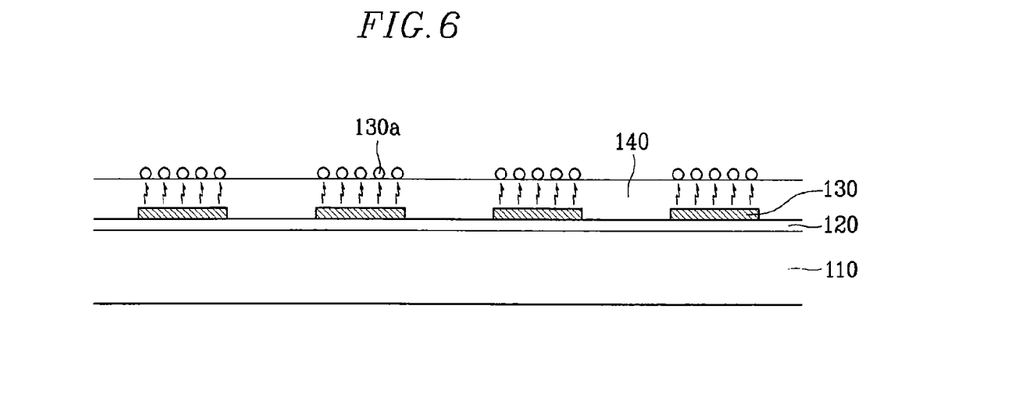

Through the annealing process, micro defects or crystal networks are formed in the silicon nitride layer 140. Accordingly, as shown in FIG. 6, catalytic metal particles 130a of the catalytic metal layers 130 diffuse to the top surface of the silicon nitride layer 140 from the bottom surface through the micro defects or crystal networks in the silicon nitride layer 140. As a result, after a predetermined time has passed, the catalytic metal particles 130a grow to grains which enable growth of carbon nanotubes from the surface of the silicon nitride layer 140.

Figure 8:
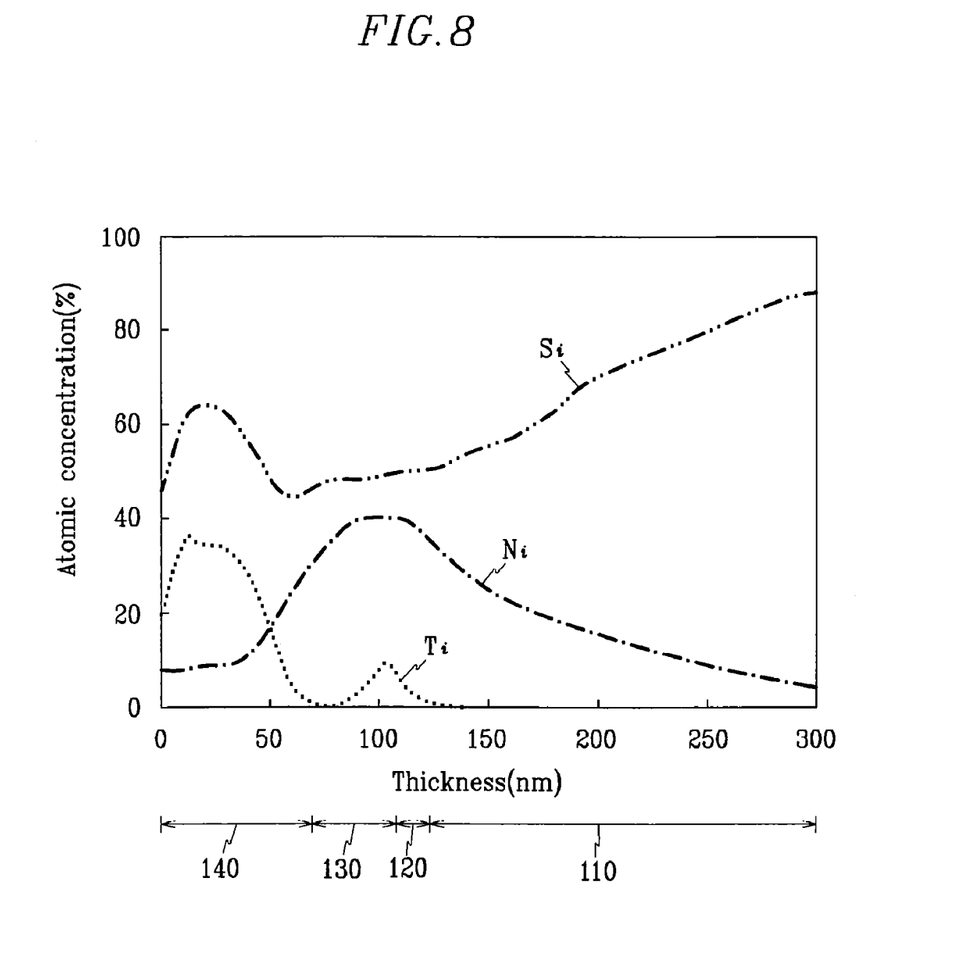
FIG. 8 is a graph illustrating the result of atomic emission spectroscopy for respective stacked layers after performing an annealing process.
Figure 9A:
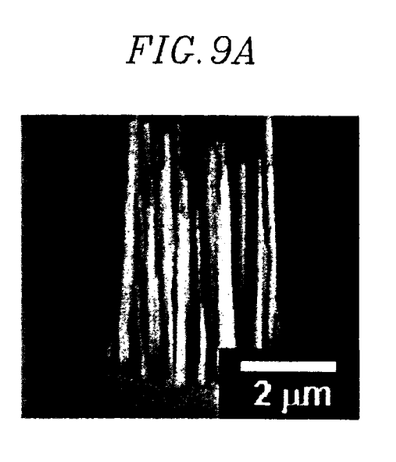
FIG. 9 is a photograph showing variation in generation density of carbon nanotubes when the thickness of a silicon nitride layer is changed to (a) 10 nm, (b) 30 nm, (c) 70 nm, (d) 100 nm, and (e) 150 nm.
Figure 9B:
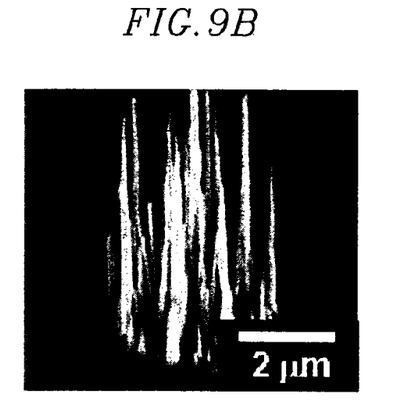
Figure 9C:
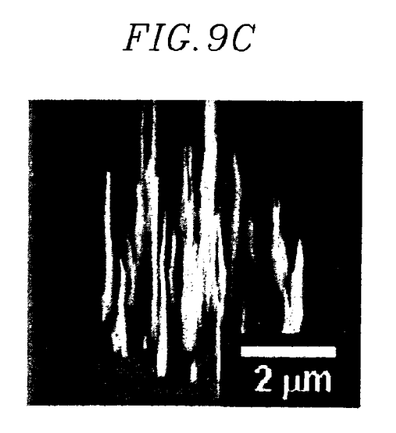
Figure 9D:
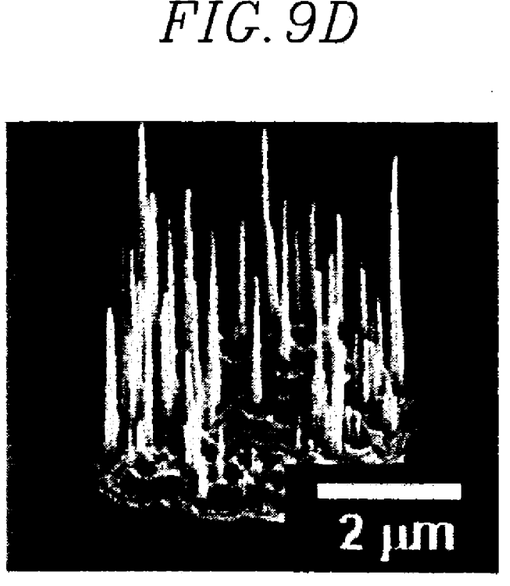
Figure 9E:
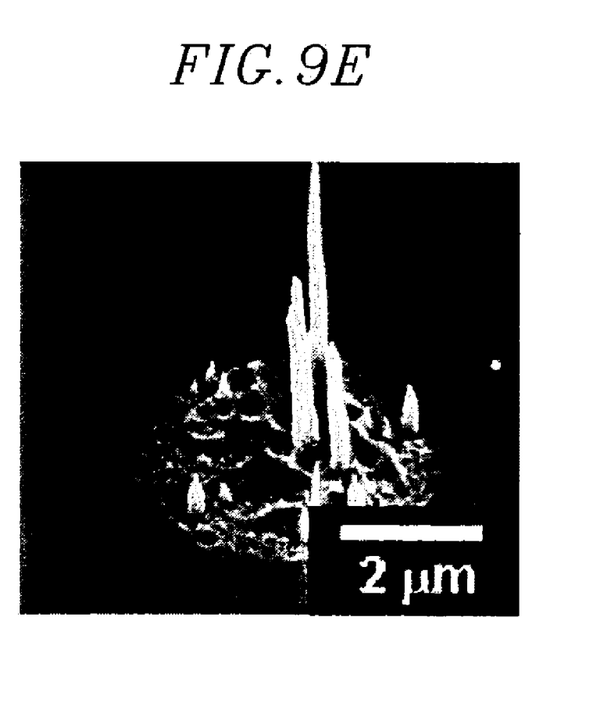

FIG. 8 is a graph illustrating the result of atomic emission spectroscopy for respective stacked layers after performing the annealing process. In FIG. 8, the axis of abscissa indicates the thicknesses of the substrate 110, the diffusion-preventing layer 120, the catalytic metal layer 130, the silicon nitride (SiNx) layer 140 (where "0" indicates the bottom surface of the silicon nitride layer 140) and the axis of ordinate indicates contents by percentage of atoms contained in the respective stacked layers.

As shown in FIG. 8, it can be seen that a small amount of nickel (Ni) moving by diffusion is included in the silicon nitride layer 140. Specifically, it has been confirmed that nickel of about 5.6% exists in the surface (area having a thickness of "0") of the silicon nitride layer 140. This means that the catalytic metal particles 130a move by diffusion through the silicon nitride layer 140.

Next, carbon nanotubes (CNT) are formed on the substrate 110 having been subjected to the annealing process by the use of a plasma enhanced chemical vapor deposition (PECVD) method.

The carbon nanotubes (CNT) are formed by supplying a hydrocarbon gas such as methane ($CH_4$), ethylene ($C_2H_2$), propylene ($C_2H_6$), or propane ($C_3Hs$) along with a gas containing nitrogen and/or hydrogen such as ammonia ($NH_3$) or a hydride gas to a plasma atmosphere having an internal temperature of about 150 to 800° C. and an internal pressure of about 2 Torr. In the present embodiment, ethylene ($C_2H_2$) of 30 sccm and ammonia ($NH_3$) of 70 sccm are supplied together to the plasma atmosphere in a state such that an upper electrode is fixed to 0V, a lower electrode is fixed to −600V, and a voltage of +300V is applied to a transmission control electrode.

The hydrocarbon gas such as methane ($CH_4$), ethylene ($C_2H_2$), propylene ($C_2H_6$), or propane ($C_3H_8$) supplied to a furnace of a plasma enhanced chemical vapor deposition (PECVD) apparatus is pyrolyzed into carbon units (C=C or C) and free hydrogen (H) in a gaseous state. Subsequently, the pyrolyzed carbon units are adsorbed on the surfaces of the catalytic metal particles 130a and are diffused and melted into the catalytic metal particles 130a with the lapse of time. When the carbon units are continuously provided, carbon nanotubes 170 grow in a longitudinal direction by means of a catalytic action of the catalytic metal particles 130a. When the catalytic metal particles 130a have a round or blunt shape, the tips of the carbon nanotubes 170 have the round or blunt shape. Not shown in the figures, when the tips of the catalytic metal particles 130a having a nanometer size are sharp, the tips of the carbon nanotubes are also sharp.

Figure 7:
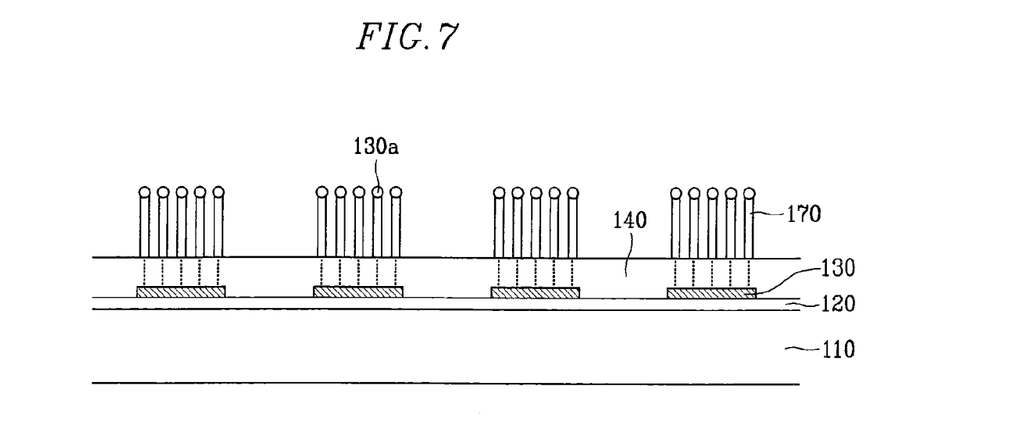
Figure 20:
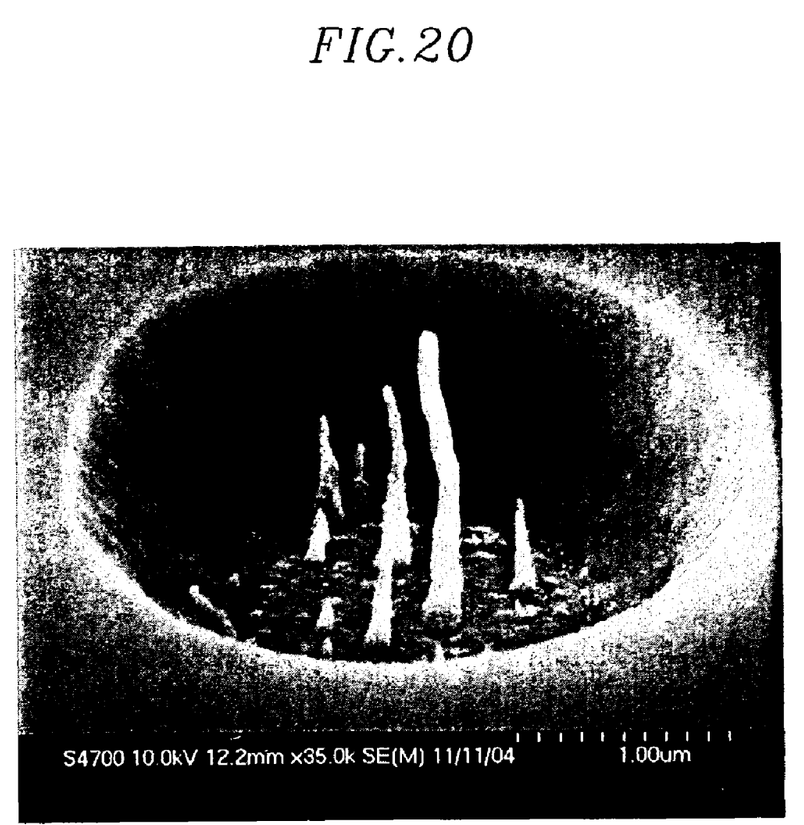
FIG. 20 is a photograph showing carbon nanotubes formed according to the present invention.

As a result, as shown in FIG. 7, a plurality of carbon nanotubes 170 having a predetermined length are formed at positions where the catalytic metal particles 130a are located. FIG. 20 is a photograph showing carbon nanotubes formed in the above-mentioned way.

As described above, in the present invention, the carbon nanotubes are made to grow through the use of the catalytic metal particles through the insulation layer such as the silicon nitride layer 140.

In this case, by adjusting the thickness of the insulation layer such as the silicon nitride layer 140, the density of the carbon nanotubes (CNT) can be controlled.

In order to confirm that the density of the carbon nanotubes (CNT) can be controlled by adjusting the thickness of the insulation layer, the generation density of the carbon nanotubes 170 was measured while the thickness of the silicon nitride layer 140 was changed to (a) 10 nm, (b) 30 nm, (c) 70 nm, (d) 100 nm, and (e) 150 nm. As a result, it was confirmed that the carbon nanotubes 170 of the cases (a) to (e) have densities of ~$10^9$/cm$^2$, ~$10^8$/cm$^2$, ~$10^6$/cm$^2$, ~$10^5$/cm$^2$, and ~$10^3$/cm$^2$, respectively. FIG. 9 is a photograph showing variation in generation density of the carbon nanotubes in the respective cases where the thickness of a silicon nitride layer is changed to (a) 10 nm, (b) 30 nm, (c) 70 nm, (d) 100 nm, and (e) 150 nm.

It can be confirmed from the photograph that the number of carbon nanotubes (170) decreases as the thickness of the silicon nitride layer 140 increases and particularly that the number of carbon nanotubes is remarkably decreased when the thickness of the silicon nitride layer 140 is 150 nm.

Figure 10:
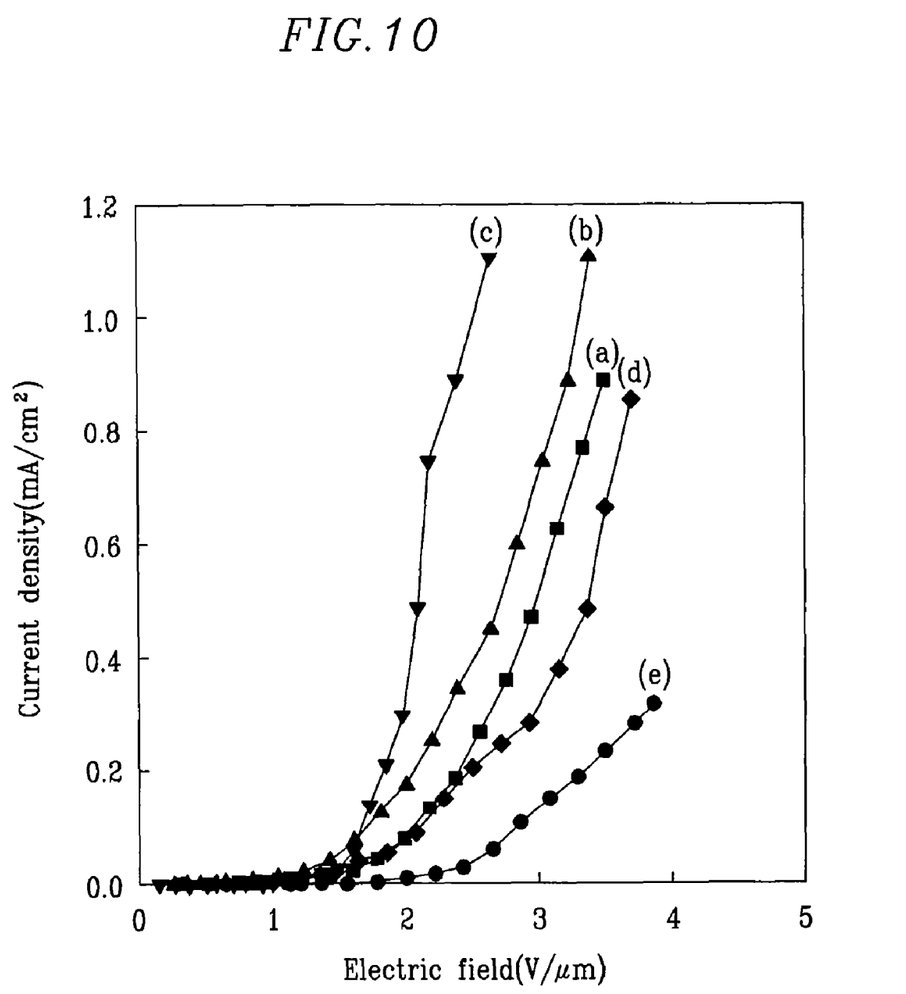
FIG. 10 is a graph illustrating a field emission characteristic per unit area of carbon nanotubes formed in the cases (a) to (e) of FIG. 9.

In order to confirm a correlation between the density of the carbon nanotubes and the field emission characteristic, current densities emitted from a unit area were measured for the carbon nanotubes formed in the cases (a) to (e), respectively. FIG. 10 is a graph illustrating a field emission characteristic per unit area of the carbon nanotubes formed in the cases (a) to (e) of FIG. 9. In the figure, the axis of abscissa indicates an electric field (V/μm) applied externally and the axis of ordinate indicates a current density (mA/cm$^2$) emitted from a unit area.

As can be seen from FIG. 10, when the same electric field is applied, the case (c) where the thickness of the silicon nitride layer is 70 nm exhibits the most excellent field emission characteristic and the case (e) where the thickness of the silicon nitride layer is 150 nm exhibits the worst field emission characteristic. This means that the density of the carbon nanotubes 170 is not linearly proportional to the field emission characteristic and the optimal density having the optimal field emission characteristic exists.

The reason is as follows. When the generation density of the carbon nanotubes is excessively low, the number of carbon nanotubes contributing to the emission of electric field decreases and thus the current density also decreases. On the other hand, when the generation density of the carbon nanotubes is excessively high, the emission of electric field decreases due to a screen effect resulting from electric field interference between the neighboring carbon nanotubes.

Therefore, in order to obtain the optimal field emission characteristic, it is important to properly control the density of the carbon nanotubes which serve as an electron emission source.

In the present invention, as the means for controlling the density of the carbon nanotubes, the insulation layer such as the silicon nitride (SiNx) layer is provided on the catalytic metal layers. By adjusting the thickness of the insulation layer in a predetermined range of thickness, it is possible to control the density of the catalytic metal particles diffusing and moving to the top surface of the insulation layer. As a result, it is possible to control the density of the carbon nanotubes formed from the catalytic metal particles.

Now, a field emission display device (FED) having the carbon nanotubes formed through the above-mentioned method and a method of manufacturing the field emission display device will be described in detail with reference to the figures.

Figure 11:
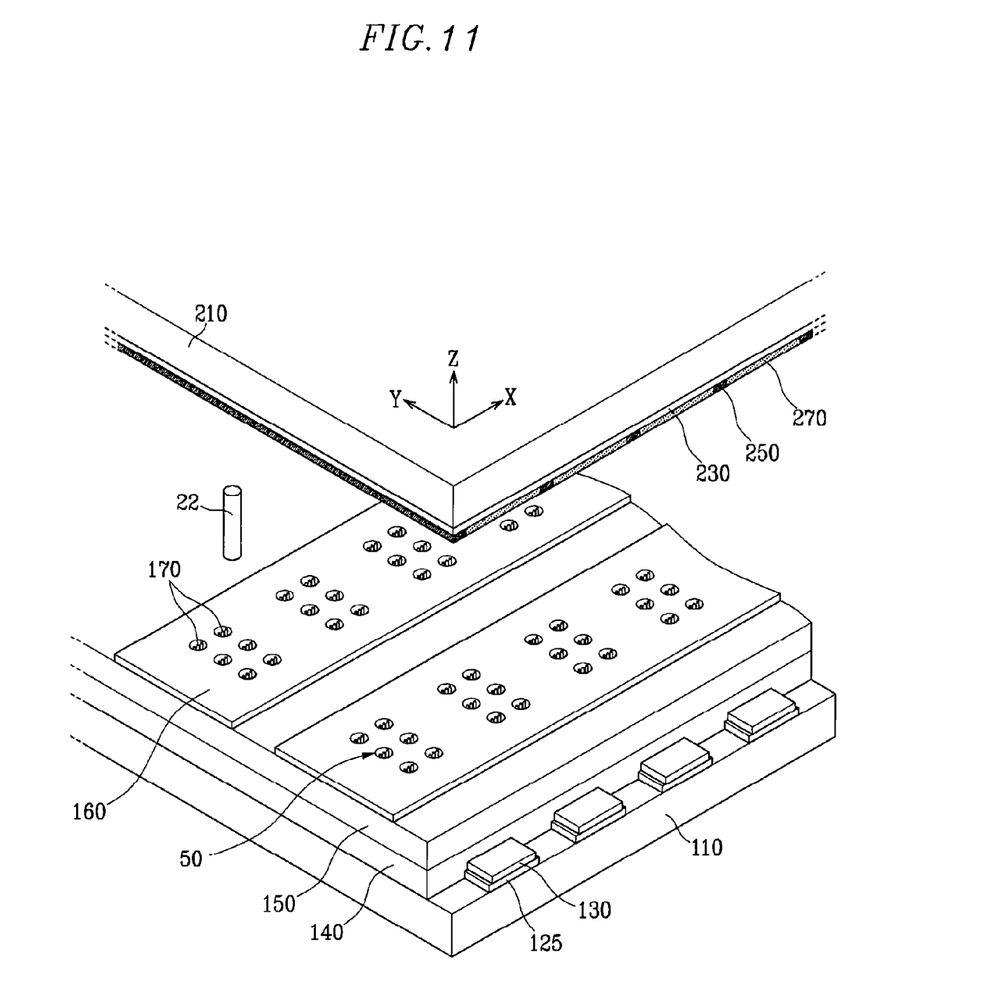
FIG. 11 is a partially exploded perspective view of a field emission display device according to an embodiment of the present invention.
Figure 12:
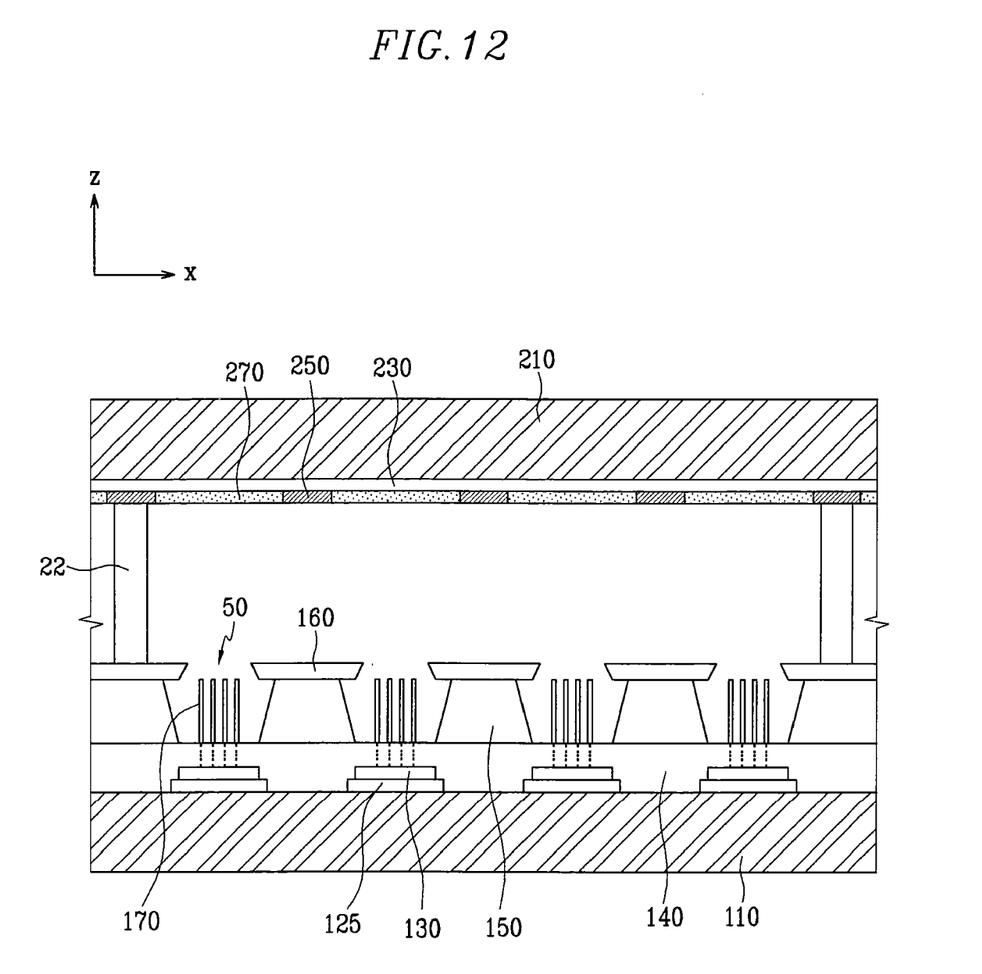
FIG. 12 is a partial cross-sectional view illustrating an assembled state of the field emission display device shown in FIG. 11.

FIG. 11 is a partially exploded perspective view of a field emission display device according to an embodiment of the present invention and FIG. 12 is a partial cross-sectional view illustrating an assembled state of the field emission display device shown in FIG. 11.

The field emission display device according to an embodiment of the present invention includes a first substrate 110 having a predetermined size, a second substrate 210 opposed to the first substrate 110, and an inner space kept in vacuum between the first substrate 110 and the second substrate 210. Electron emission portions 170 for emitting electrons are provided in the first substrate 110 and fluorescent layers 270 for emitting visible rays by the electrons are provided in the second substrate 210.

On the first substrate 110, as an example, a plurality of striped cathode electrodes 125 are formed along a side of the first substrate 110 with predetermined intervals and a diffusion-preventing layer (not shown) made of titanium (Ti) or a titanium alloy (Ti-alloy) is formed on the cathode electrodes 125. The diffusion-preventing layer serves to prevent catalytic metal of a catalytic metal layer deposited thereon later from diffusing into the substrate 110 but may be omitted in some cases.

On the diffusion-preventing layer, catalytic metal layers 130 are patterned with predetermined intervals at positions corresponding to the cathode electrodes 125. The catalytic metal layer 130 is made of a single metal such as nickel (Ni), iron (Fe), or cobalt (Co), or an alloy such as cobalt-nickel (Co—Ni), cobalt-iron (Co—Fe), nickel-iron (Ni—Fe), or cobalt-nickel-iron (Co—Ni—Fe).

A silicon nitride (SiNx) layer 140 is formed on the entire surface including the catalytic metal layers 130. Alternatively, an insulation layer made of silicon oxi-nitride (SiON) or amorphous carbon may be formed instead of the silicon nitride (SiNx) layer. The insulation layers made of silicon nitride (SiNx), silicon oxi-nitride (SiON), and amorphous carbon, respectively, have a common point in that micro defects are generated in the layers by heating the layers. The silicon nitride layer 140 has a thickness of about 10 to 150 nm.

An oxide layer 150 is formed on the silicon nitride layer 140 and a plurality of gate electrodes 160 are formed on the oxide layer 150 in a direction perpendicularly intersecting the cathode electrodes 125.

Supposing that the intersections between the cathode electrodes 125 and the gate electrodes 160 are defined as pixel areas, at least one hole 50 is formed in the oxide layer 150 and the gate electrodes 160 for every pixel area. The electron emission portion 170 is exposed through the holes 50. The electron emission portion 170 is made of carbon nanotubes.

When a predetermined drive voltage is applied to the cathode electrodes 125 and the gate electrodes 160, an electric field is formed around the electron emission portion 170 and thus electrons are emitted from the electron emission portion 170.

Next, an anode electrode 230 is formed on the second substrate 210 opposed to the first substrate 110, black matrixes 250 isolated with predetermined intervals are formed on the anode electrode 230, and fluorescent layers 270 are formed at positions corresponding to the pixel areas between the black matrixes 250. Alternatively, not shown in the figures, the black matrixes 250 and the fluorescent layers 270 may be formed on the second substrate 210 and an anode made of an opaque metal such as aluminum (Al) may be formed on the black matrixes 250 and the fluorescent layers 270. In this case, a voltage required for accelerating electron beams is applied externally to the anode electrode made of an opaque metal, and the anode electrode serves to enhance brightness of a screen thanks to a metal back effect.

Spacers 22 for maintaining the gap between the first and second substrates 110 and 210 are formed between the first substrate 110 and the second substrate 210 and the internal space is maintained in vacuum. In this way, a field emission display device is formed.

Now, a method of manufacturing the field emission display device according to an embodiment of the present invention will be described.

First, a method of manufacturing the first substrate 110 will be described in detail with reference to FIGS. 13 to 17.

Figure 13:
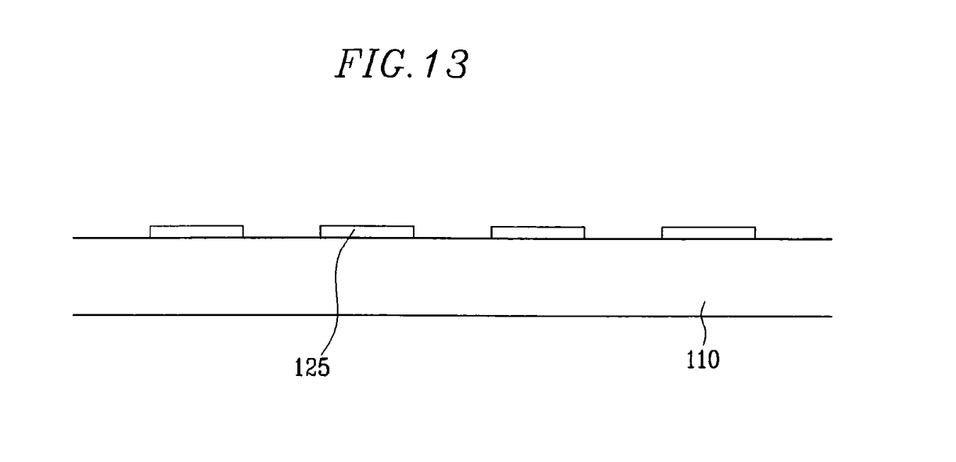
FIGS. 13 to 18 are cross-sectional views sequentially illustrating a method of manufacturing a field emission display device according to an embodiment of the present invention.

A metal layer made of chromium (Cr), titanium (Ti), or tungsten (W) is formed on a substrate 110 made of glass, quartz, silicon, or alumina ($Al_2O_3$) by the use of a sputtering process. Next, the metal layer is patterned by the use of a photolithography process. As a result, as shown in FIG. 13, striped cathode electrodes 125 extending in a direction are formed.

Next, a diffusion-preventing layer (not shown) made of titanium (Ti) or a titanium alloy (Ti-alloy) in which tungsten (W) is mixed with titanium (Ti) is formed on the cathode electrodes 125. The diffusion-preventing layer has a thickness of about 5 to 20 nm. The diffusion-preventing layer serves to prevent catalytic metal of a catalytic metal layer deposited thereon later from diffusing into the substrate 110, but may be omitted in some cases.

Next, a catalytic metal layer 130 is formed on the diffusion-preventing layer by the use of a lift-off process.

The lift-off process is performed as follows.

First, a photo resist pattern (not shown) is formed by depositing and patterning photo resist on the cathode electrodes 125 and the diffusion-preventing layer (not shown). The photo resist pattern is formed to expose areas in which the cathode electrodes 125 are formed. Next, the catalytic metal layer 130 is formed on the entire surface of the substrate 110 including the photo resist pattern. The catalytic metal layer 130 is made of a single metal such as nickel (Ni), iron (Fe), or cobalt (Co), or an alloy such as cobalt-nickel (Co—Ni), cobalt-iron (Co—Fe), nickel-iron (Ni—Fe), or cobalt-nickel-iron (Co—Ni—Fe). The catalytic metal layer 130 is formed on the substrate 110 with a thickness of several Å to several tens of Å, preferably 3 to 30 Å, through the use of a thermal evaporation method, a sputtering method, or an electron beam evaporation method. Next, the photo resist pattern is removed.

Figure 14:
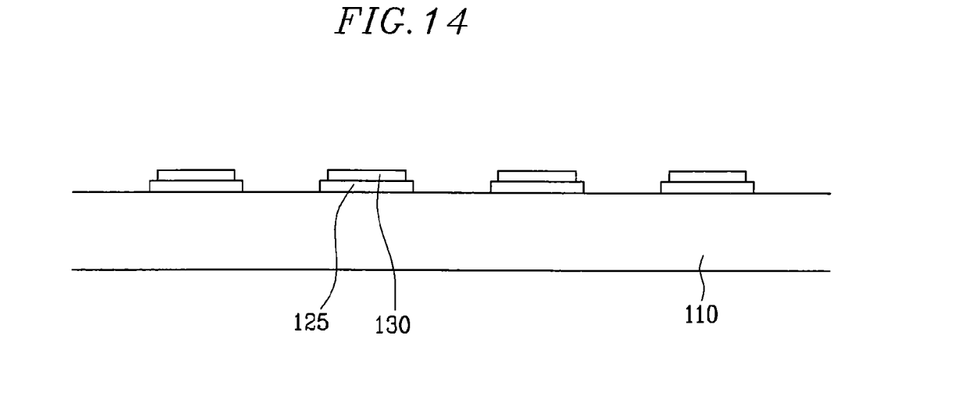

As a result, the catalytic metal layers 130 isolated with predetermined intervals are formed as shown in FIG. 14.

In the present embodiment, the lift-off process of first forming the photo resist and then forming the catalytic metal layer is used for forming the catalytic metal layer 130. However, a lithography process of first forming the catalytic metal layer 130 on the entire surface of the substrate 110 and then depositing and exposing the photo resist may be used instead of the lift-off process.

Figure 15:
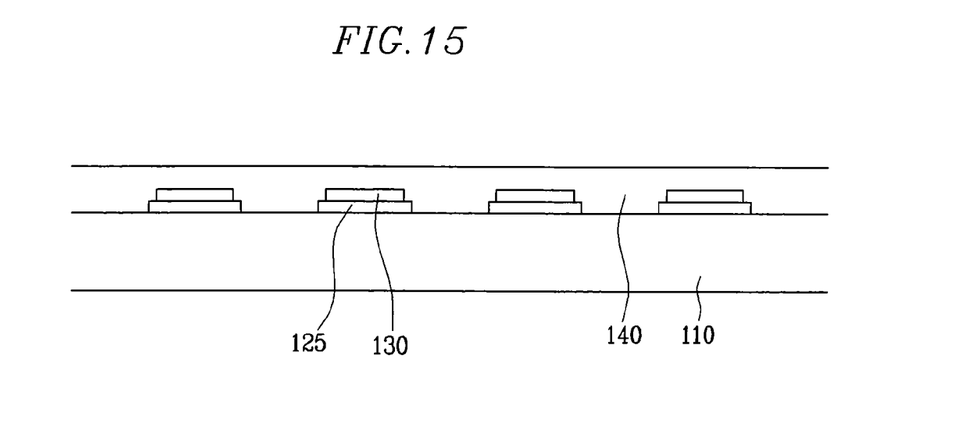

Subsequently, as shown in FIG. 15, a silicon nitride (SiNx) layer 140 is formed on the entire surface of the substrate 110 including the catalytic metal layer 130. Instead of the silicon nitride (SiNx) layer, an insulation layer made of silicon oxi-nitride (SiON) or amorphous carbon may be formed. The insulation layers made of silicon nitride (SiNx), silicon oxi-nitride (SiON), and amorphous carbon, respectively, have a common point in that micro defects are generated in the layers by heating the layers. The silicon nitride layer 140 has a thickness of about 10 to 150 nm.

Next, an oxide layer 150 made of silicon oxide ($SiO_2$) is formed 1 to 10 μm thick, on the silicon nitride 140 by the use of a chemical vapor deposition (CVD) method and then a metal layer 160 made of chromium (Cr) or molybdenum (Mo) is formed on the oxide layer 150.

Figure 16:
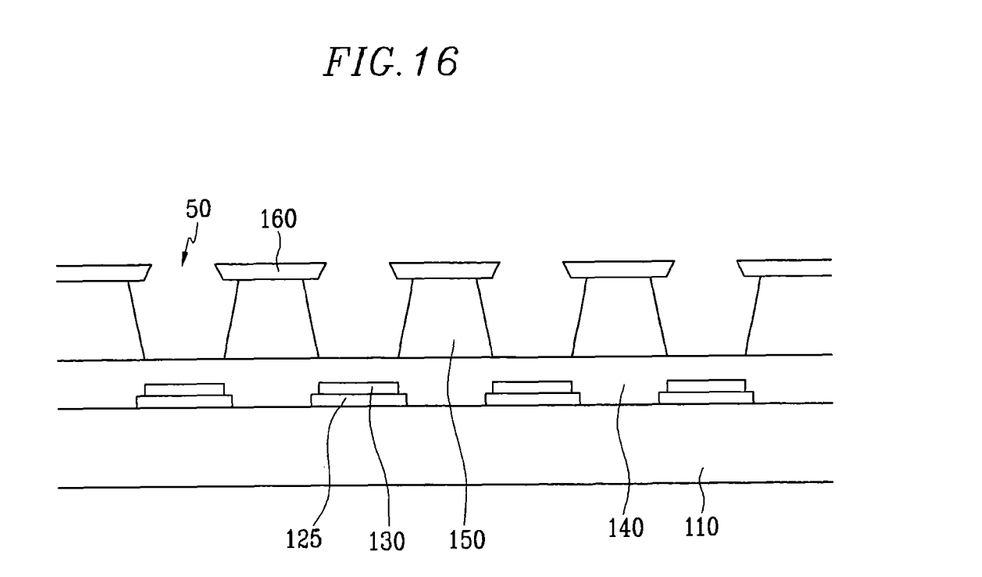

Subsequently, the metal layer and the oxide layer are patterned by the use of the lithography process such that one or more holes 50 are formed in the metal layer and the oxide layer. The holes 50 are formed at positions corresponding to the patterned catalytic metal layers 130.

As a result, as shown in FIG. 16, the oxide layer 150 and the gate electrodes 160 having a plurality of holes 50 formed therein are formed on the catalytic metal layers 130.

Figure 19:
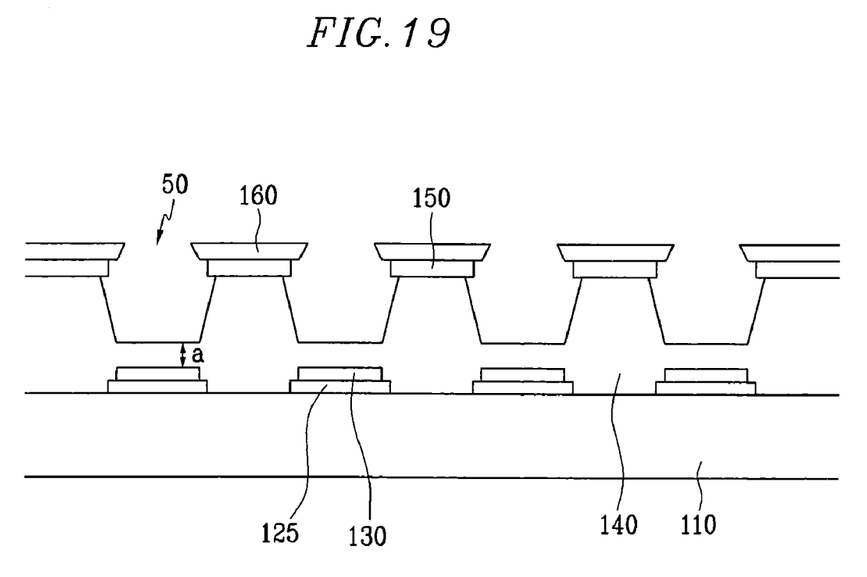
FIG. 19 is a cross-sectional view illustrating a process step of a method of manufacturing a field emission display device according to another embodiment of the present invention.

Alternatively, as shown in FIG. 19, the silicon nitride layer 140 is formed to be about 1 to 10 μm thick and then the oxide layer 150 and the gate electrodes 160 are sequentially formed to be about 100 to 300 nm thick on the silicon nitride layer 140. Next, the holes 50 are formed in the gate electrodes 160 and the oxide layer 150 and then the silicon nitride layer 140 for controlling a generation density of catalytic metal grains is etched with a thickness of about 30 to 150 nm left.

By using any one of the above-mentioned methods, only the silicon nitride layer 140 with a thickness of about 30 to 150 nm is formed on the catalytic metal layer 130.

Figure 18:
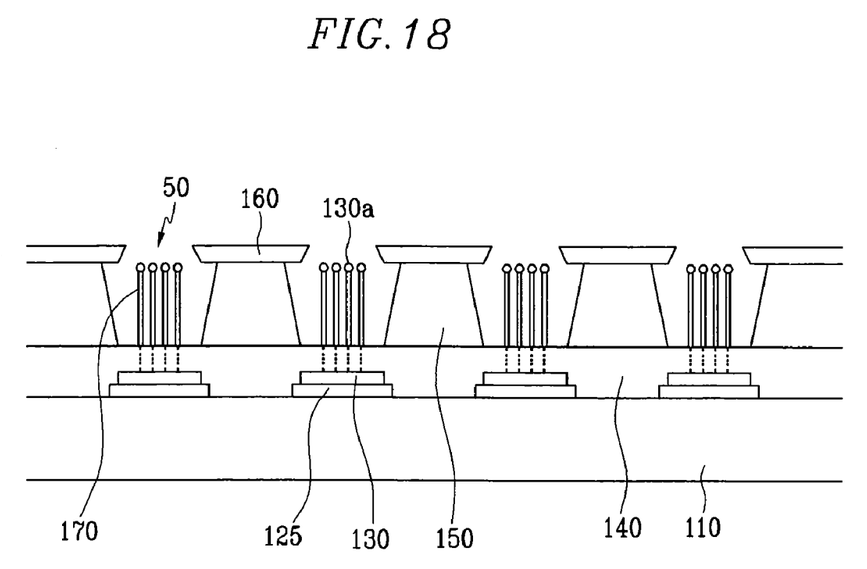

Next, an annealing process is performed to the substrate 110 shown in FIG. 16 or 18 in a plasma furnace. The annealing process is performed at a temperature of about 300 to 800° C. for about 100 to 300 minutes.

Figure 17:
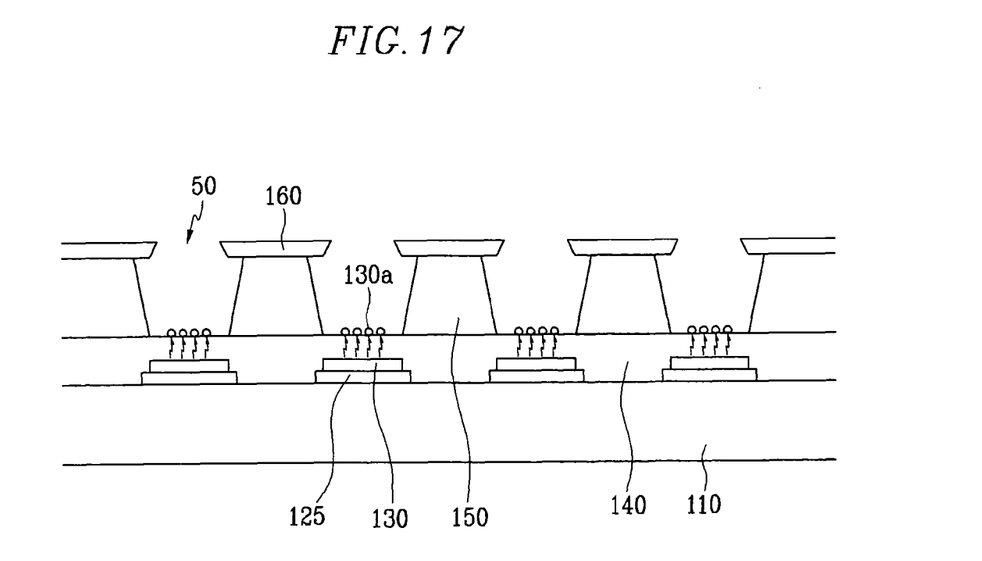

Through the annealing process, micro defects or crystal networks are formed in the silicon nitride layer 140. Accordingly, as shown in FIG. 17, catalytic metal particles 130a of the catalytic metal layer 130 diffuse to the top surface of the silicon nitride layer 140 from the bottom surface thereof through the micro defects or crystal networks in the silicon nitride layer 140. As a result, after a predetermined time has passed, the catalytic metal particles 130a grow to grains which enable growth of carbon nanotubes from the surface of the silicon nitride layer 140.

Next, the carbon nanotubes (CNT) are formed on the substrate 110 having been subjected to the annealing process.

The carbon nanotubes (CNT) are formed by supplying a hydrocarbon gas such as methane ($CH_4$), ethylene ($C_2H_2$), propylene ($C_2H_6$), or propane ($C_3H_8$) along with a gas containing nitrogen and/or hydrogen such as ammonia ($NH_3$) or a hydride gas to a plasma atmosphere having an internal temperature of about 150 to 800° C. and an internal pressure of about 2 Torr. In the present embodiment, ethylene ($C_2H_2$) of 30 sccm and ammonia ($NH_3$) of 70 sccm are supplied together to the plasma atmosphere, in a state such that an upper electrode is fixed to 0V, a lower electrode is fixed to −600V, and a voltage of +300V is applied to a transmission control electrode.

The hydrocarbon gas such as methane ($CH_4$), ethylene ($C_2H_2$), propylene ($C_2H_6$), or propane ($C_3H_8$) supplied to the furnace of a plasma enhanced chemical vapor deposition (PECVD) apparatus is pyrolyzed into carbon units (C═C or C) and free hydrogen (H) in a gaseous status. Subsequently, the pyrolyzed carbon units are adsorbed on the surfaces of the catalytic metal particles 130a and are then diffused and melted into the catalytic metal particles 130a. With continuous supply of the carbon units, carbon nanotubes 170 grow in a longitudinal direction by means of a catalytic action of the catalytic metal particles 130a. When the catalytic metal particles 130a have a round or blunt shape, the tips of the carbon nanotubes 170 have the round or blunt shape. Not shown in the figures, when the tips of the catalytic metal particles 130a having a nanometer size are sharp, the tips of the carbon nanotubes are also sharp.

As a result, as shown in FIG. 18, electron emission portions 170 composed of the carbon nanotubes are formed at positions where the catalytic metal particles 130a are located. The catalytic metal particles 130a on the top of the electron emission portions 170 may be left it is through the subsequent processes or may be removed through a particular process.

The generation density of the carbon nanotubes can be controlled by the use of the thickness of the silicon nitride layer 140. For example, when the silicon nitride layer 140 has the thicknesses of 10 nm, 30 nm, 70 nm, 100 nm, and 150 nm, the carbon nanotubes 170 have the densities of $\sim 10^9/cm^2$, $\sim 10^8/cm^2$, $\sim 10^6/cm^2$, $\sim 10^5/cm^2$, and $\sim 10^3/cm^2$, respectively, in accordance with the thicknesses.

In this case, in consideration of the number of carbon nanotubes contributing to the screen effect and the emission of electrons, it is most preferable that the silicon nitride layer 140 is formed about 70 nm thick to exhibit the most excellent electron emission effect.

Next, a method of manufacturing the second substrate 210 opposed to the first substrate 110 will be described.

An anode electrode 230 made of a transparent material such as ITO is formed on the second substrate 210 made of transparent glass or the like. Subsequently, black matrixes 250 isolated from each other with predetermined intervals are formed by forming and then patterning a black matrix on the anode electrode 230. Next, fluorescent layers 270 causing light emission of red (R), green (G), and blue (B) colors are formed between the black matrixes 250.

Next, spacers 22 having a length of about 100 to 700 μm are formed on the gate electrodes 160 of the first substrate 110. Thereafter, by turning over the second substrate 210 on which the anode electrode 230 and the fluorescent layers 270 are formed, placing the second substrate 210 on the spacers 22, and sealing the first and second substrates 110 and 210 in vacuum, a field emission display device is completed.

In the field emission display device formed in the above-mentioned way, when an electric field is applied across the cathode electrodes 125 and the anode electrode 230, electrons are emitted from the electron emission portions 170 composed of the carbon nanotubes having grown vertically and the emitted electrons collide with the fluorescent layers 270, thereby emitting visible rays of red, green, and blue colors. At this time, thanks to the electric field applied across the gate electrodes 160 and the cathode electrodes 125, the electrons can easily collide with the fluorescent layers 270, thereby emitting light. That is, the field emission display device according to the present invention is a three-electrode field emission display device having a cathode electrode, an anode electrode, and a gate electrode.

It has been described that the carbon nanotubes according to the present invention are used in the field emission display device, but this is only an example. That is, the carbon nanotubes according to the present invention may be used in a vacuum fluorescent display (VFD), a fluorescent lamp, a backlight, and the like, which employ the carbon nanotubes in the same way.

As described above, it is possible to easily control the generation density of carbon nanotubes by adjusting the thickness of the insulation layer made of silicon nitride (SiNx), silicon oxi-nitride (SiON), or amorphous carbon in a predetermined range of thickness. Therefore, since the carbon nanotubes exhibiting the optimal field emission characteristic can be formed, it is possible to apply the carbon nanotubes to a variety of field emission display devices with a high production yield and a large area.

Although the exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A method of forming carbon nanotubes, the method comprising:
    forming a catalytic metal layer on a substrate;
    forming an insulation layer on the catalytic metal layer; and
    forming carbon nanotubes on the insulation layer by forming micro defects in the insulation layer by annealing.

2. The method of claim 1, wherein in forming the catalytic metal layer, the catalytic metal layer is made of at least one selected from the group consisting of nickel (Ni), iron (Fe), cobalt (Co), and alloys thereof.

3. The method of claim 1, wherein in forming the catalytic metal layer, the catalytic metal layer is patterned by the use of a lift-off process or a lithography process.

4. The method of claim 1, wherein the insulation layer is made of at least one of silicon nitride (SiNx), silicon oxynitride (SiON), and amorphous carbon.

5. The method of claim 1, wherein the insulation layer has a thickness of 10 to 150 nm.

6. The method of claim 1, wherein the forming of the carbon nanotubes comprises:
    performing a plasma enhanced chemical vapor deposition process using at least one kind of hydrocarbon gas.

7. The method of claim 1, wherein the annealing of the substrate is performed at a temperature of 300 to 800 degrees C.

8. The method of claim 6, wherein in performing the plasma enhanced chemical vapor deposition process, a gas including at least one of hydrogen and nitrogen is used along with the at least one kind of hydrocarbon gas.

9. The method of claim 1, further comprising: forming a diffusion-preventing layer on the substrate before the forming of the catalytic metal layer.

10. The method of claim 9, wherein the diffusion-preventing layer is made of one of titanium (Ti) and a titanium alloy (Ti-alloy).

11. The method of claim 1, further comprising: forming an oxide layer after the forming of the insulation layer.

12. A method of manufacturing a field emission display device, the method comprising:
    forming a cathode layer on a first substrate;
    forming a catalytic metal layer in a predetermined area on the cathode layer;
    forming an insulation layer on the entire surface of an exposed area of the catalytic metal layer, the cathode layer and the first substrate;
    forming a gate electrode on the insulation layer;
    forming carbon nanotubes on the insulation layer by forming micro defects in the insulation layer by annealing; and
    forming an anode electrode and a fluorescent layer on a second substrate opposed to the first substrate.

13. The method of claim 12, wherein the catalytic metal layer is made of at least one selected from the group consisting of nickel (Ni), iron (Fe), cobalt (Co), and alloys thereof.

14. The method of claim 12, wherein in forming the catalytic metal layer, the catalytic metal layer is patterned by the use of a lift-off process or a lithography process.

15. The method of claim 12, wherein the insulation layer is made of at least one of silicon nitride (SiNx), silicon oxinitride (SiON), and amorphous carbon.

16. The method of claim 12, wherein the insulation layer has a thickness of 10 to 150 nm.

17. The method of claim 12, wherein the forming of the carbon nanotubes comprises:

performing a plasma enhanced chemical vapor deposition process using at least one kind of hydrocarbon gas.

18. The method of claim 12, wherein the annealing of the first substrate is performed at a temperature of 300 to 800 degrees C.

19. The method of claim 17, wherein in performing the plasma enhanced chemical vapor deposition process, a gas including at least one of hydrogen and nitrogen is used along with the at least one kind of hydrocarbon gas.

20. The method of claim 12, further comprising: forming a diffusion-preventing layer on the first substrate before the forming of the catalytic metal layer.

21. The method of claim 20, wherein the diffusion-preventing layer is made of one of titanium (Ti) and a titanium alloy (Ti-alloy).

22. The method of claim 12, further comprising: forming an oxide layer after the forming of the insulation layer.

* * * * *